UNITED STATES PATENT OFFICE.

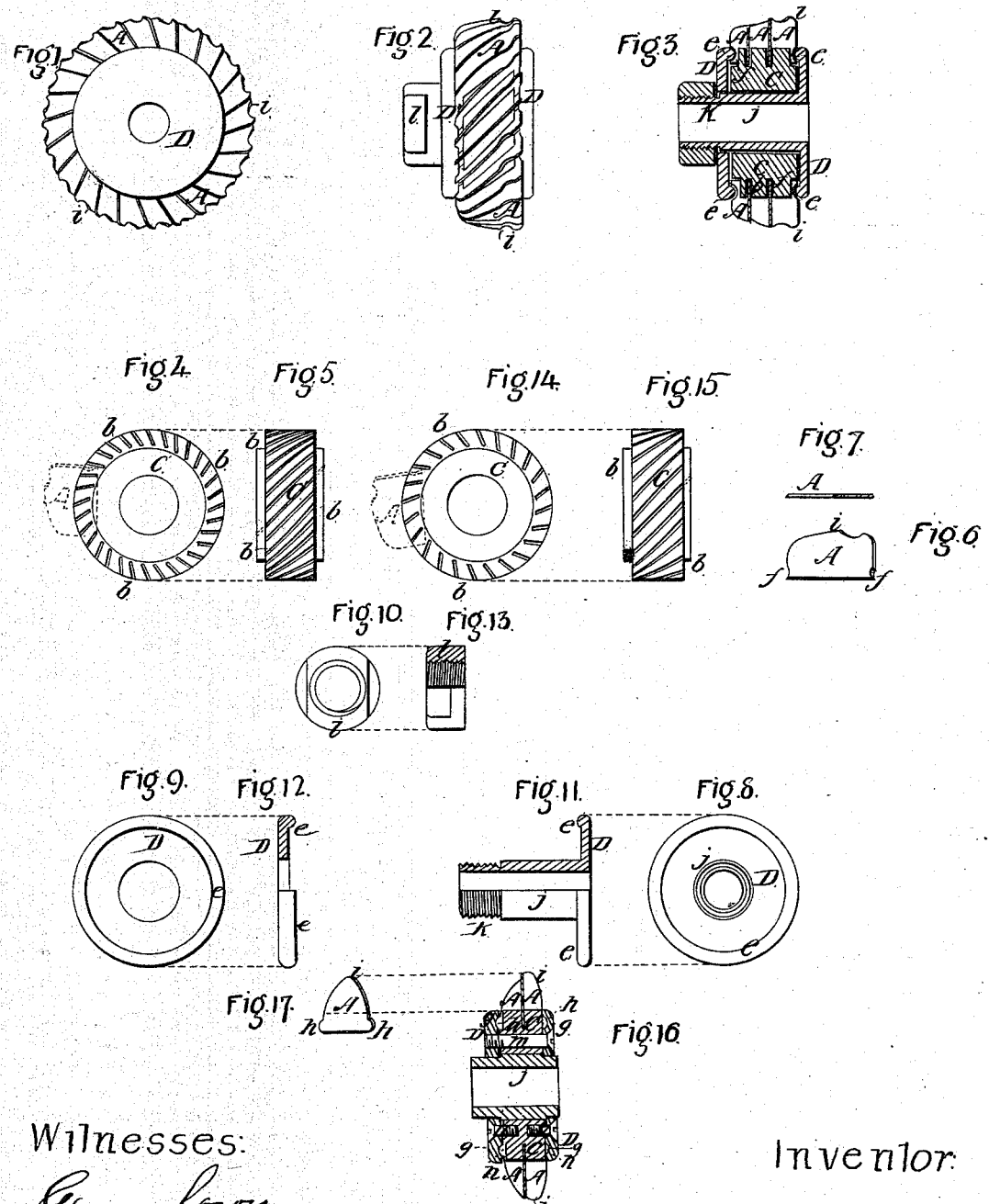

LUKE KAVANAUGH, OF WATERFORD, NEW YORK, ASSIGNOR TO HIMSELF AND GAGE, CAMPBELL & GAGE, OF SAME PLACE.

IMPROVEMENT IN BURRS FOR KNITTING-MACHINES.

Specification forming part of Letters Patent No. 35,565, dated June 10, 1862.

*To all whom it may concern:*

Be it known that I, LUKE KAVANAUGH, of the village of Waterford, in the county of Saratoga and State of New York, have invented a new and useful Improvement in Burrs for Knitting-Machines; and I do hereby declare that the following is a full and exact description of my said invention, reference being had to the annexed drawings, in which—

Figure 1 is an end view, Fig. 2 an edge view, and Fig. 3 a section in the plane of the axis, of a yarn-sinking knitting-burr embodying my invention; Fig. 4 an end view, and Fig. 5 a side view, of the hub of the knitting-burr shown in Figs. 1, 2, and 3, and Fig. 6 a side view, and Fig. 7 an edge view, of one of the wings or blades of the same burr. Figs. 8, 9, and 10 are end views, and Figs. 11, 12, and 13 side or edge views, partly in section, of the parts by which the wings are secured in the slotted hub of the burr shown by Figs. 1, 2, and 3. Fig. 14 is an end view, and Fig. 15 a side view, of a hub like that shown by Figs. 4 and 5, but with a less number of oblique radial slots around its circumference. Fig. 16 is a section in the plane of the axis, and Fig. 17 a side view, of one of the wings or blades of a casting-off burr in which my invention is embodied.

The same letters of reference indicate like parts in all the figures.

The distinguishing feature of my said improvement in knitting-burrs is the holding of the series of separable wings A fast in the oblique radial slots *b* in the hub C by means of two detachable rings or plates, D D, engaged with and clamped against the ends of the obliquely-arranged wings in the hub, so that by simply unfastening and disengaging one or both of the said clamping-plates or holding-rings from the end or ends of the wings any one or more or all of the wings can then be freely slid out of the hub and a new wing or wings inserted instead, and so that the burr can be altered into one of a coarser gage by merely transferring to a suitable hub a sufficient number of the wings and the said end-plates with their clamping devices.

In the knitting-burr shown by Figs. 1, 2, and 3 the clamp-plates D D have circular projections *e*, Figs. 3, 8, 11, 12, 9, fitting into corresponding recesses, *f*, Figs. 3 and 6, in the ends of the wings A; and in the burr shown in Fig. 16 the clamp-plates have annular grooves *g*, into which fit corresponding projections, *h*, Fig. 17, on the wings; but the clamp-plates and wings may have any other suitable construction that will make the clamp-plates engage with and securely hold the wings with their outer edges, *i*, substantially in a circle concentric with the axis of the burr.

In the burr shown by Figs. 1, 2, and 3 the bushing *j* of the hub C is separate from the hub, and fast at one end to one of the clamp-disks D, Figs. 3 and 11, and has on its other end a screw, *k*, and corresponding nut, *l*, Figs. 3, 11, 10, and 13, by which the plates D D are tightened upon the ends of the wings A, and in the burr shown in section by Fig. 16 the bushing *j* may be either fast or loose in the hub C, and is separate from the clamp-plates D D, which are in that case clamped against the ends of the wings A by means of screws *m n n*, passed into or through the hub between the bushing and the slots in the rim of the hub; but any other equivalent or suitable device or devices may be employed to clamp the holding-disks D D firmly against the ends of the obliquely-arranged wings A in the slotted hub.

What I claim as new and of my invention, and desire to secure by Letters Patent, is—

A rotary knitting-burr having removable wings A, held stationary within oblique radial slots *b* in a hub, C, by means of detachable rings or disks D D, engaged with and clamped against the ends of the wings, substantially as herein set forth.

LUKE KAVANAUGH.

Witnesses:
GEORGE LOWRY,
J. CRAMER, 2d.